(12) United States Patent
Luoma et al.

(10) Patent No.: US 7,369,520 B2
(45) Date of Patent: May 6, 2008

(54) INTERNET PROTOCOL ADDRESS TO PACKET IDENTIFIER MAPPING

(75) Inventors: Juha-Pekka Luoma, Tampere (FI); Lin Xu, Tampere (FI)

(73) Assignee: Nokia Corporation (FI)

( * ) Notice: Subject to any disclaimer, the term of this patent is extended or adjusted under 35 U.S.C. 154(b) by 1173 days.

(21) Appl. No.: 10/117,730

(22) Filed: Apr. 5, 2002

(65) Prior Publication Data

US 2003/0063615 A1    Apr. 3, 2003

Related U.S. Application Data

(63) Continuation-in-part of application No. 09/969,297, filed on Oct. 2, 2001.

(51) Int. Cl.
*H04J 1/10* (2006.01)

(52) U.S. Cl. .................. 370/312; 370/392; 370/486; 725/74; 725/98

(58) Field of Classification Search .............. None
See application file for complete search history.

(56) References Cited

U.S. PATENT DOCUMENTS

| | | | |
|---|---|---|---|
| 5,548,340 A | 8/1996 | Bertram | |
| 6,188,684 B1 | 2/2001 | Setoyama et al. | |
| 6,275,989 B1 | 8/2001 | Broadwin et al. | |
| 6,288,738 B1 | 9/2001 | Dureau et al. | |
| 6,477,179 B1 | 11/2002 | Fujii et al. | |
| 6,523,064 B1 | 2/2003 | Akatsu et al. | |
| 6,557,031 B1* | 4/2003 | Mimura et al. | 709/218 |
| 6,961,758 B2* | 11/2005 | Krishnan | 709/217 |
| 6,987,734 B2* | 1/2006 | Hundemer | 370/237 |
| 7,039,048 B1* | 5/2006 | Monta et al. | 370/389 |
| 7,089,577 B1* | 8/2006 | Rakib et al. | 725/87 |
| 2002/0024967 A1* | 2/2002 | Zaun et al. | 370/429 |
| 2002/0059614 A1* | 5/2002 | Lipsanen et al. | 725/75 |
| 2002/0131428 A1* | 9/2002 | Pecus et al. | 370/401 |

FOREIGN PATENT DOCUMENTS

| | | |
|---|---|---|
| EP | 1 089 470 A1 | 4/2001 |
| WO | WO 00/65429 | 11/2000 |

OTHER PUBLICATIONS

Handley et al., "RFC 2974—Session Announcement Protocol", Oct. 2000, pp. 1, 2, & 8.*
PCT International Search Report mailed Oct. 14, 2003, (PCT/IB02/04009).
European Telecommunications Standards Institute, "Digital Video Broadcasting (DVB); Specification for Service Information (SI) in DVB Systems", EN 300 468 V1.3.1 (Feb. 1998).
European Telecommunications Standards Institute, "Digital Video Broadcasting (DVB); Implementation Guidelines for the Use of MPEG-2 Systems, Video and Audio in Satellite, Cable and Terrestrial Broadcasting Applications", ETSI TR 101 154 V1.4.1 (Jul. 2000).

* cited by examiner

*Primary Examiner*—Edan Orgad
*Assistant Examiner*—Jung Park
(74) *Attorney, Agent, or Firm*—Banner & Witcoff, Ltd.

(57) ABSTRACT

A digital video broadcast (DVB) receiver and methods are provided for processing Internet data. The DVB receiver receives at least one announcement message mapping an Internet protocol address to a transport stream packet identifier. Using the information, the DVB receiver may configure a demultiplexer to filter service components according to an Internet protocol address.

20 Claims, 5 Drawing Sheets

C=DVB SERVICE unicast29.datacast.bbc.com/134 ← 402
a=subnet: IN IP4 10.20.0.0/16 ← 403
a=data-path:forward ← 404
a=framing:dvb/mpe ← 405
a=bearer:dvb-t ← 406

Figure 4

C=DVB SERVICE PID 1234 ← 502
a=subnet: IN IP4 10.20.0.0/16 ← 503
a=data-path:forward ← 504
a=framing:dvb/mpe ← 505

Figure 5

INTERNET PROTOCOL ADDRESS TO PACKET IDENTIFIER MAPPING

This application is a continuation-in-part of U.S. patent application Ser. No. 09/969,297, filed Oct. 2, 2001.

BACKGROUND OF THE INVENTION

1. Field of the Invention

The invention relates to digital video broadcasting. More particularly, the invention relates to transmitting Internet protocol packets on a digital video broadcasting network.

2. Description of Related Art

Conventional digital video broadcast (DVB) services transmit Internet protocol (IP) data to end-users via a transport stream. A DVB compliant transport stream contains one or more DVB services. Each DVB service consists of one or more component streams called DVB service components. Each service component consists of transport stream packets identified by a packet identifier (PID) value that is assigned by a service provider and is unique within a particular transport stream. Each service component is also uniquely identified within a transport stream by the combination of the service identifier and component tag values assigned by the service provider. Unicast IP data and multicast IP data are identified by a limited number of packet identifiers. For example, all unicast IP data may be identified by a single packet identifier and all multicast IP data may be identified by a second packet identifier. The use of a limited number of packet identifiers requires extensive processing by the DVB receivers that receive the transport stream. In particular, when receiving unicast IP data, a DVB receiver must process all of the data transmitted under the single or limited number of unicast IP packet identifiers. This data includes not only the data addressed to the DVB receiver, but also includes data addressed to all or several other DVB receivers.

Some proposed solutions to this problem have involved using new protocols to provide digital video services. One drawback of these solutions is that they require modifying the hardware or software components of existing DVB receivers.

Therefore, there exists a need in the art for systems and methods for transmitting IP data over DVB service networks that require reduced processing by DVB receivers and that do not require extensive modifications to existing DVB receivers.

BRIEF SUMMARY OF THE INVENTION

The above-mentioned needs in the art are satisfied by the disclosed systems and methods that utilize the mapping of IP addresses to packet identifiers. DVB service components within a transport stream can be efficiently filtered according to transport stream packet identifiers by demultiplexers of DVB receivers. Demultiplexers may be implemented with hardware components to reduce the processing requirements of a DVB receiver processor or the CPU of a computer.

In a first embodiment, a method of processing transport stream packets transmitted in a digital video broadcast is provided. The method includes receiving information assigning an Internet protocol address to a first transport stream packet identifier. A transport stream packet containing a second transport stream packet identifier is also received. Next, it is determined whether the second transport stream packet identifier corresponds to the Internet protocol address. When the second transport packet identifier corresponds to the Internet protocol address, the transport stream packet is further processed.

In another embodiment, a digital video broadcast receiver that identifies Internet protocol data transmitted in a digital video broadcast using transport stream packets identified by a unique transport stream packet identifier is provided. The digital video broadcast receiver includes a demultiplexer that identifies transport stream packet identifiers. A memory contains an Internet protocol address and a corresponding transport stream packet identifier. The DVB receiver includes a processor programmed with computer-executable instructions to perform the steps comprising: receiving the identification of an Internet protocol address; retrieving from the memory the transport stream packet identifier corresponding to the Internet protocol address; and causing the demultiplexer to identify transport stream packets containing payloads addressed to the Internet protocol address.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which:

FIG. 4 illustrates a portion of an announcement message that includes the identification of a service component, in accordance with an embodiment of the invention.

FIG. 5 illustrates a portion of an announcement message that includes the identification of a transport stream packet identifier, in accordance with an embodiment of the invention.

DETAILED DESCRIPTION OF THE INVENTION

Figure 1:
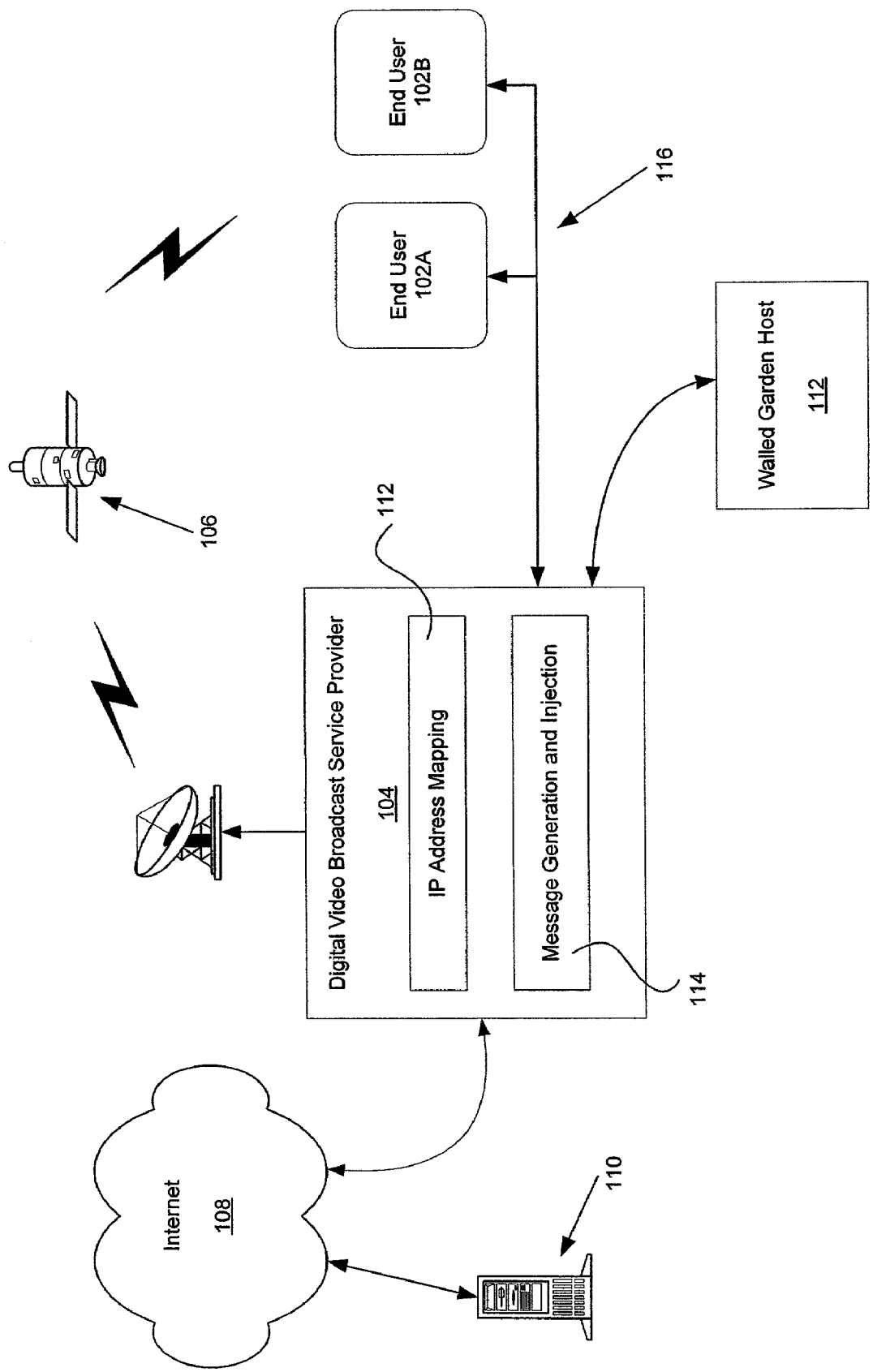
FIG. 1 shows a schematic diagram of a digital video broadcasting system in accordance with an embodiment of the invention.

FIG. 1 shows a schematic diagram of a digital video broadcasting system in accordance with an embodiment of the invention. End users 102A and 102B receive data transmitted by DVB service provider 104. DVB service provider 104 transmits IP based content (e.g., audio, video, web pages, etc.) along with native audio, data and/or video streams. FIG. 1 shows an embodiment in which the service provider 104 transmits data to end users 102A and 102B via a satellite 106. Of course, service provider 104 may transmit data to end users 102A and 102B via other transmission paths, such as paths that include cable or terrestrial transmitters. The DVB transmission path provides a unidirectional, broadband datalink for sending IP data to end users 102A and 102B. End users 102A and 102B may communicate with service provider 104 via a return path 116. Return path 116 may include a telephone network, narrowband datalink, Internet 108 or some other path. Service provider 104 is coupled to the Internet 108. As is well-known, a large number of computers, servers and other devices may be coupled to the Internet 108. FIG. 1 shows a single server 110 coupled to the Internet 108 for illustration purposes. Of course, embodiments of present invention may be used with wide area networks other than the Internet.

Service provider 104 may also be connected to other sources of data, such as walled garden host 112. Unlike communicating with the Internet 108, end users 102A and 102B can only communicate with walled garden host 112 via service provider 104.

In addition to transmitting conventional video broadcast data to end users, service provider 104 includes modules for efficiently transmitting IP packets to end-users. An IP address mapping module 112 maps IP addresses to transport stream packet identifier values in a manner that is described in detail below. A message generation and injection module 114 generates messages that contain the information mapping IP addresses to transport stream packet identifier values and injects the messages into signals broadcasted by service provider 104.

Figure 2:
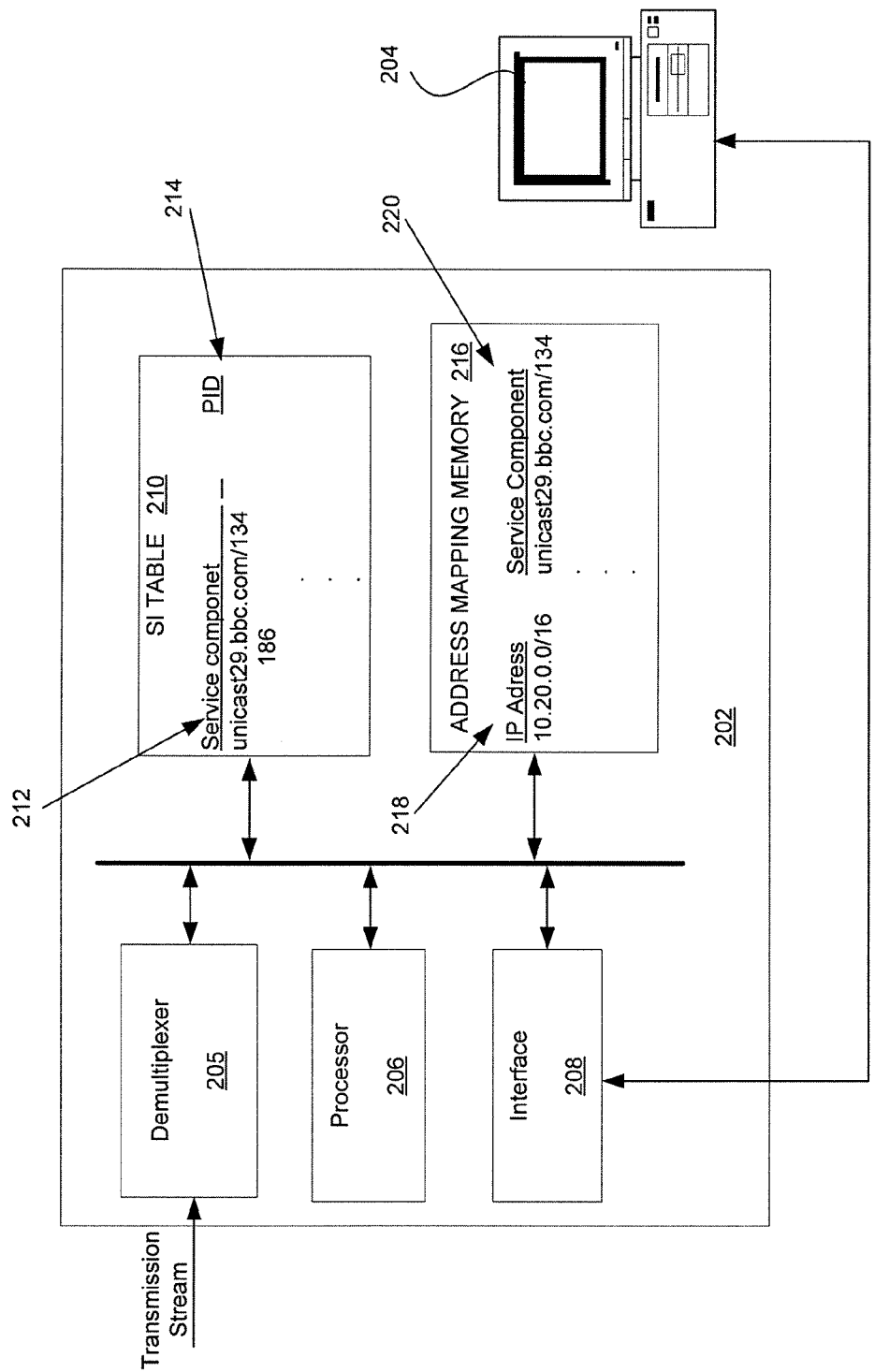
FIG. 2 illustrates end user equipment in accordance with an embodiment of the invention.

FIG. 2 illustrates a DVB receiver 202 and a computer device 204 in accordance with an embodiment of the invention. A demultiplexer 205 receives and filters transport stream packets. Filtering may be performed based on the transport stream packet identifier used to identify each service component. A processor 206 is included for controlling the operation of demultiplexer 205 and the other components included within receiver 202. An interface 208 may be included in embodiments in which receiver 202 is coupled to a computer device 204.

Receiver 202 may also include a database 210 that includes DVB service information (SI). In particular, database 210 includes a table mapping DVB service components 212 to transport stream packet identifiers 214. An address mapping memory 216 may be included to store information from announcement messages mapping IP addresses 218 to DVB service components 220. A message mapping memory 222 that may store information from announcement messages mapping IP addresses 224 directly to transport stream packet identifiers 226 may also be included. In one embodiment, announcement messages are broadcasted by service provider 104 using the session announcement protocol (SAP). The payload of session announcement protocol messages may be, for example, in the session description protocol (SDP) format or in the extensible markup language (XML) format. Other protocols, such the Internet control message protocol (ICMP) or unidirectional hypertext transfer protocol (UHTTP), can be used for sending the messages as an alternative to the session announcement protocol.

Messages may be delivered using the IP over multiprotocol encapsulation DVB data broadcasting profile. Messages mapping IP addresses to DVB service components or transport stream packet identifiers may be delivered on the highest component tag of each DVB service that includes IP data components to allow end user equipment to easily locate the messages. Utilizing announcement messages to map IP addresses to packet identifiers allows the disclosed mapping technique to be implemented with a wide variety of existing devices, such as conventional DVB receivers. Database 210, address mapping memory 216 and message mapping memory 222 may be implemented with a single memory module. In operation, receiver 202 may be configured to filter transport stream packets, create IP packets and transmit the IP packets to computer 204. Computer 204 may have a static or dynamic IP address. Receiver 202 may identify a service component corresponding to the IP address of computer 204 by analyzing the information in address mapping memory 216. The packet identifier of a corresponding component stream may then be determined by analyzing the information in SI table 210. Alternatively, in embodiments that include announcement messages that map IP addresses directly to packet identifiers, the packet identifier for a corresponding IP address may be determined by analyzing the information in address mapping memory 222. Then, demultiplexer 205 may be configured to filter transport stream packets according to packet identifier values. Transport stream packets that contain IP data addressed to computer 204 may be transmitted to computer 204 via interface 208. Alternatively, the IP packets may be first decapsulated from one or more transport stream packets, and then transmitted to computer 204 via interface 208.

Figure 3:
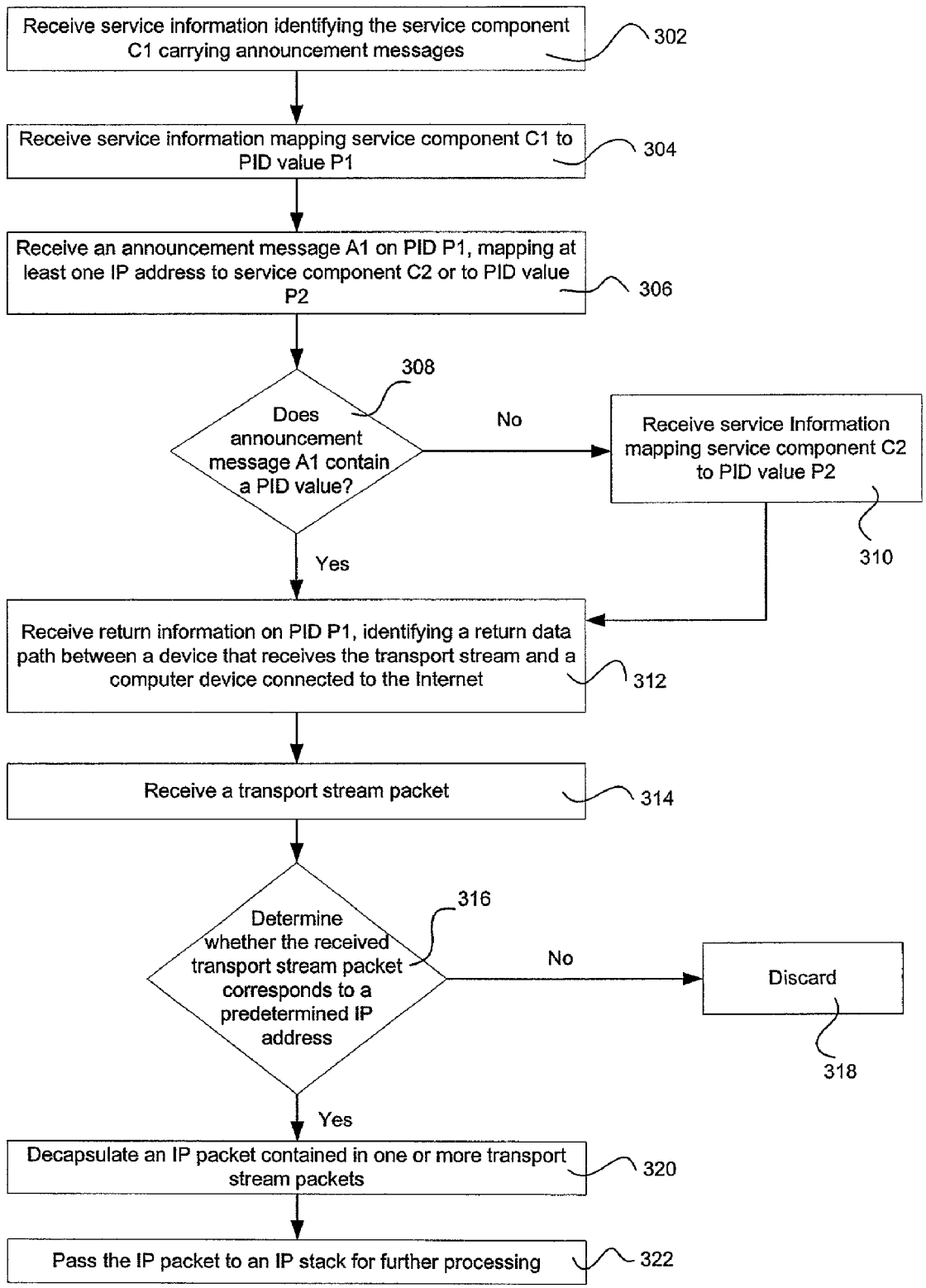
FIG. 3 illustrates a method of processing transport stream packets with a DVB receiver in accordance with an embodiment of the invention.

FIG. 3 illustrates a method of mapping IP addresses to packet identifiers and processing transport stream packets in accordance with various embodiments of the invention. First, in step 302, a DVB receiver receives service information identifying a service component C1 carrying announcement messages. Each DVB service component may be identified by a unique identifier, such as a packet identifier or the combination of service identifier and component tag. Next, the receiver may receive service information mapping the service component C1 carrying announcement messages to a packet identifier value P1 in step 304. Packet identifier P1 may be used to filter announcement messages. Steps 302 and 304 may be performed when a DVB receiver is initialized at startup, during handover from one DVB transmitter to another DVB transmitter, periodically during updates or at other times.

In step 306, the DVB receiver may receive an announcement message A1 on a transport packet identified by packet identifier P1 and that maps at least one IP address to a service component C2 or maps at least one IP address directly to a packet identifier P2. In one embodiment of the invention, the DVB receiver may be configured to receive and processes both types of announcement messages. In alternative embodiments, the DVB receiver may be configured to process only one type of message.

In step 308, it is determined whether announcement message A1 contains a direct mapping to a packet identifier value. When announcement message A1 does not contain a direct mapping to a packet identifier value, in step 310, the DVB receiver receives service information mapping service component C2 to PID value P2. Service component C2 and PID value P2 may be stored in SI table 210 (shown in FIG. 2).

In step 310, the receiver may receive return information identifying a return path between the receiver and a computer device connected to the Internet. Return information may be transmitted on PID P1. Step 310 may be performed when the DVB receiver desires to utilize a return path, during handover from one DVB transmitter to another DVB transmitter or at other times. In one embodiment of the invention, the return information is transmitted to the DVB receiver via the DVB network. In another embodiment, the return information is received when the DVB service provider transmits electronic mail messages to an end user via a mail server. The return information may identify a protocol, a return path, a telephone number, an authentication requirement or other information that allows a recipient of the transmission stream to reply to a source. An Internet address may also be identified for the return channel, instead of or in addition to the telephone number. In embodiments that utilize an Internet address, the receiver may use an Internet Service Provider (ISP) to connect to the Internet (e.g. via the PSTN or a GSM network), then set up a return channel connection via the Internet. In some embodiments, an Internet address and a phone number may be provided. The phone number may correspond to a preferred ISP to use for the return path.

A transport stream packet is received in step 314. It is next determined whether the transport stream packet corresponds to a predetermined IP address in step 316. The predetermined IP address may correspond to an address of a DVB receiver, an address assigned to a computer coupled to a DVB receiver, an address of a computer that is not coupled to a DVB receiver, or an address of another device. In one embodiment of the invention, the determination includes comparing the packet identifier of the transport stream packet to packet identifier value P2. As described above, packet identifier value P2 may be received in an announcement message or determined from an announcement message that identifies a service component and service information that maps the service component to the packet identifier value.

When the transport stream packet does not correspond to the predetermined IP address, the transport stream packet is discarded in step 318. When the transport stream packet does correspond to the predetermined IP address, the transport stream packet may be further processed by the DVB receiver or a computer device. IP data may be sent to DVB receivers using IP over multiprotocol encapsulation (IP/MPE). IP over multiprotocol encapsulation is conventionally used for transmitting IP packets over DVB networks. In step 320, for example, the further processing may include decapsulating an IP packet contained in one or more transport stream packets. In step 322, the IP packet may be passed to an IP stack for further processing.

The present invention may also be used in connection with multicast data. For example, a range of IP addresses in which each address corresponds to a multicast IP group may be mapped to a DVB service component. The software running on a DVB receiver, an attached computer or other device can configure the receiver to receive any number of multicast groups. A DVB receiver may then compare the packet identifiers associated with received transport stream packets to information mapping IP addresses to packet identifiers. The information mapping IP addresses to packet identifiers may be contained in a service information table and one or more announcement messages or within a single announcement message.

Announcement messages mapping IP addresses to service components or transport packet identifiers may be sent to DVB receivers using IP over multiprotocol encapsulation (IP/MPE). IP over multiprotocol encapsulation is conventionally used for transmitting IP packets over DVB networks. The announcement messages may contain fields for identifying information such as the data path, bearer, framing, network access service and subnet. The data path field may identify whether the transmission path is a forward path or a return path. The bearer field may identify the type of DVB network used to transmit the transmission stream. The framing field may be used identify the manner which the IP packets are encapsulated by the DVB service provider or the manner in which data is sent on a return data path. A network access service field may be included to identify protocol used for identifying users, such as RADIUS, Diameter, IPsec, L2TP or PPTP, or to indicate that the user will be prompted for username and password as an identification. The subnet field may contain the IP network address and the length (in bits) of the IP subnet mask.

FIG. 4 illustrates an exemplary portion of a SAP announcement message that includes the identification of a service component and that is used to announce a unicast transmission without a return path. Line 402 defines the DVB service component as "unicast29.datacast.bbc.com/134." Line 403 indicates that the DVB service component carries data addressed to the IP network address 10.20.0.0/16. Lines 404 and 405 indicate that the data path is a forward data path that uses DVB multiprotocol encapsulation. Line 406 identifies the network as a terrestrial DVB network.

Information from the SAP message shown in FIG. 4 may be stored in address mapping memory 216. The information allows DVB receiver 202 to associate DVB service component "unicast29.datacast.bbc.com/134" with IP network address "10.20.0.0/16." DVB receiver 202 can then utilize the information contained in SI table 210 to determine that particular packet identifier 186 is assigned to DVB service component "unicast29.datacast.bbc.com/134." Demultiplexer 205 may then be configured to pass transmission streams having a packet identifier value of 186.

FIG. 5 illustrates an exemplary portion of a SAP announcement message that includes the identification of a transport stream packet identifier and that is used to announce a unicast transmission without a return path. Line 502 identifies a service component with transport packet identifier 1234. Line 503 indicates that transport stream packets identified the transport packet identifier carry data addressed to the IP network address 10.20.0.0/16. Lines 504 and 505 indicate that the data path is a forward data path that uses DVB multiprotocol encapsulation.

Figure 6:
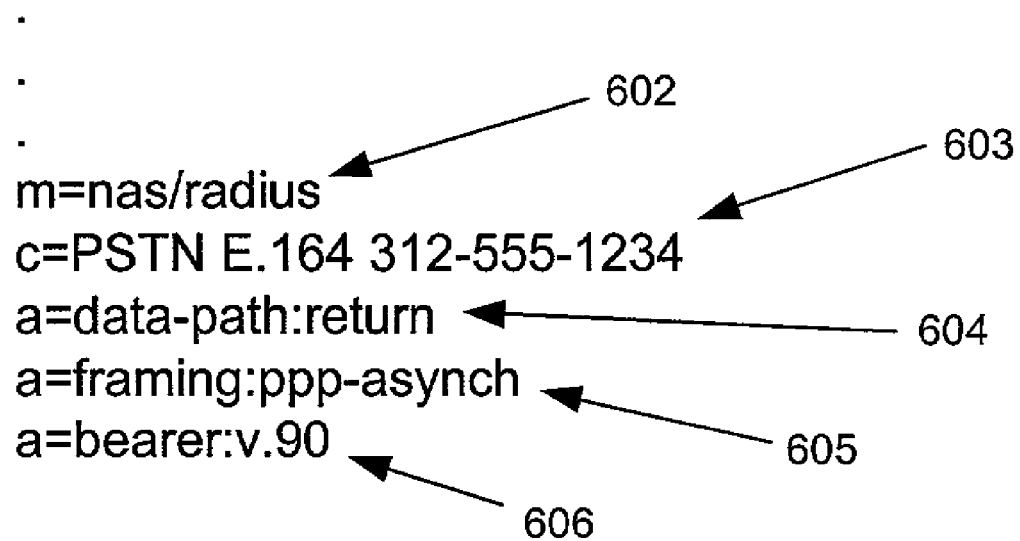
FIG. 6 illustrates a portion of an announcement message that identifies a return path in accordance with an embodiment of the invention.

FIG. 6 illustrates an exemplary portion of a SAP message that includes return path information. Line 602 indicates that the RADIUS protocol is used to authenticate users. Line 603 indicates that the return data path is via a telephone network and the phone number is (312)-555-1234. Lines 604-606 identify the data path as a return data path that uses asynchronous PPP over a V.90 modem link. Of course, additional or alternative information may be included. For example, in embodiments in which the SAP message identifies a phone number and Internet address for the return path, a line such as "c=IN IP4 130.230.1.66" may be included to identify the Internet address and the phone number may correspond to a preferred ISP.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, aspects of the present invention may be used with digital audio broadcast services and other digital video or data systems. Moreover, the order of steps shown in FIG. 3 is merely exemplary and that steps may be arranged in several different orders. Those skilled in the art will also understand that the term "DVB service component" is used in this patent application as a generic term for any of the data streams and other elementary streams that may be included within a DVB service.

We claim:

1. A method comprising:
    receiving information assigning an Internet protocol address to a first transport stream packet identifier, comprising:
        receiving service identification information mapping a broadcast service component to a first transport stream identifier; and
        receiving at least one announcement message mapping at least one Internet protocol address to a broadcast service component;

receiving a transport stream packet containing a second transport stream packet identifier;

determining by a demultiplexer whether the second transport stream packet identifier corresponds to the Internet protocol address; and further processing the transport stream packet when the second transport packet identifier corresponds to the Internet protocol address.

2. The method of claim 1, wherein the announcement message is received on the highest component tag of a broadcast service component that includes Internet protocol data.

3. The method of claim 1, wherein the announcement message is in the session announcement protocol format.

4. The method of claim 3, wherein a payload of the announcement messages is in the session description protocol format.

5. The method of claim 3, wherein a payload of the announcement message is in the extensible markup language format.

6. The method of claim 1, wherein the at least one announcement message is in the Internet control message protocol format.

7. The method of claim 1, wherein the at least one announcement message is in the unidirectional hypertext transfer protocol format.

8. The method of claim 1, wherein the Internet protocol address comprises an Internet protocol address of a digital video broadcast receiver.

9. The method of claim 1, wherein the at least one Internet protocol address comprises an Internet protocol address of a computer device.

10. The method of claim 1, wherein the Internet protocol address comprises an Internet protocol address of a multicast group.

11. The method of claim 1, further comprising:

receiving return information identifying a return path between a device that receives a payload of the transport stream packet and a computer device connected to the Internet.

12. The method of claim 11, wherein the return information includes the identification of a protocol.

13. The method of claim 11, wherein the return information includes the identification of a telephone number, an Internet protocol address or both.

14. The method of claim 11, further including the step of transmitting data through the return path to the computer device connected to the Internet.

15. The method of claim 1, wherein (c) comprises comparing the first transport stream packet identifier to the second transport stream packet identifier.

16. The method of claim 1, wherein (d) comprises decapsulating the transport stream packet.

17. An apparatus comprising:

a demultiplexer configured to identify transport stream packet identifiers by receiving service identification information mapping a broadcast service component to a first transport stream identifier and receiving at least one announcement message mapping at least one Internet protocol address to a broadcast service component;

a memory configured to contain an Internet protocol address and a corresponding transport stream packet identifier; and a processor programmed with computer-executable instructions to perform:

receiving the identification of an Internet protocol address;

retrieving from the memory the transport stream packet identifier corresponding to the Internet protocol address; and causing the demultiplexer to identify transport stream packets containing payloads addressed to the Internet protocol address.

18. The apparatus of claim 17, wherein the processor is further programmed with computer-executable instructions to perform causing the demultiplexer to transmit to an external computer device the payload of transport stream packets containing payloads addressed to the Internet protocol address.

19. A computer readable-medium containing computer-executable instructions for causing a processor to perform:

receiving information assigning an Internet protocol address to a first transport stream packet identifier, comprising:

receiving service identification information mapping a broadcast service component to a first transport stream identifier; and receiving at least one announcement message mapping at least one Internet protocol address to a broadcast service component;

receiving a transport stream packet containing a second transport stream packet identifier;

determining by a demultiplexer whether the second transport stream packet identifier corresponds to the Internet protocol address; and further processing the transport stream packet when the second transport packet identifier corresponds to the Internet protocol address.

20. The computer readable-medium of claim 19, further including computer-executable instructions for causing the processor to perform:

causing the demultiplexer to transmit to an external computer device the payload of transport stream packets containing payloads addressed to the Internet protocol address.

* * * * *